O. O. OZIAS.
SCALE.
APPLICATION FILED MAR. 6, 1908.
921,881.
Patented May 18, 1909.
2 SHEETS—SHEET 1.
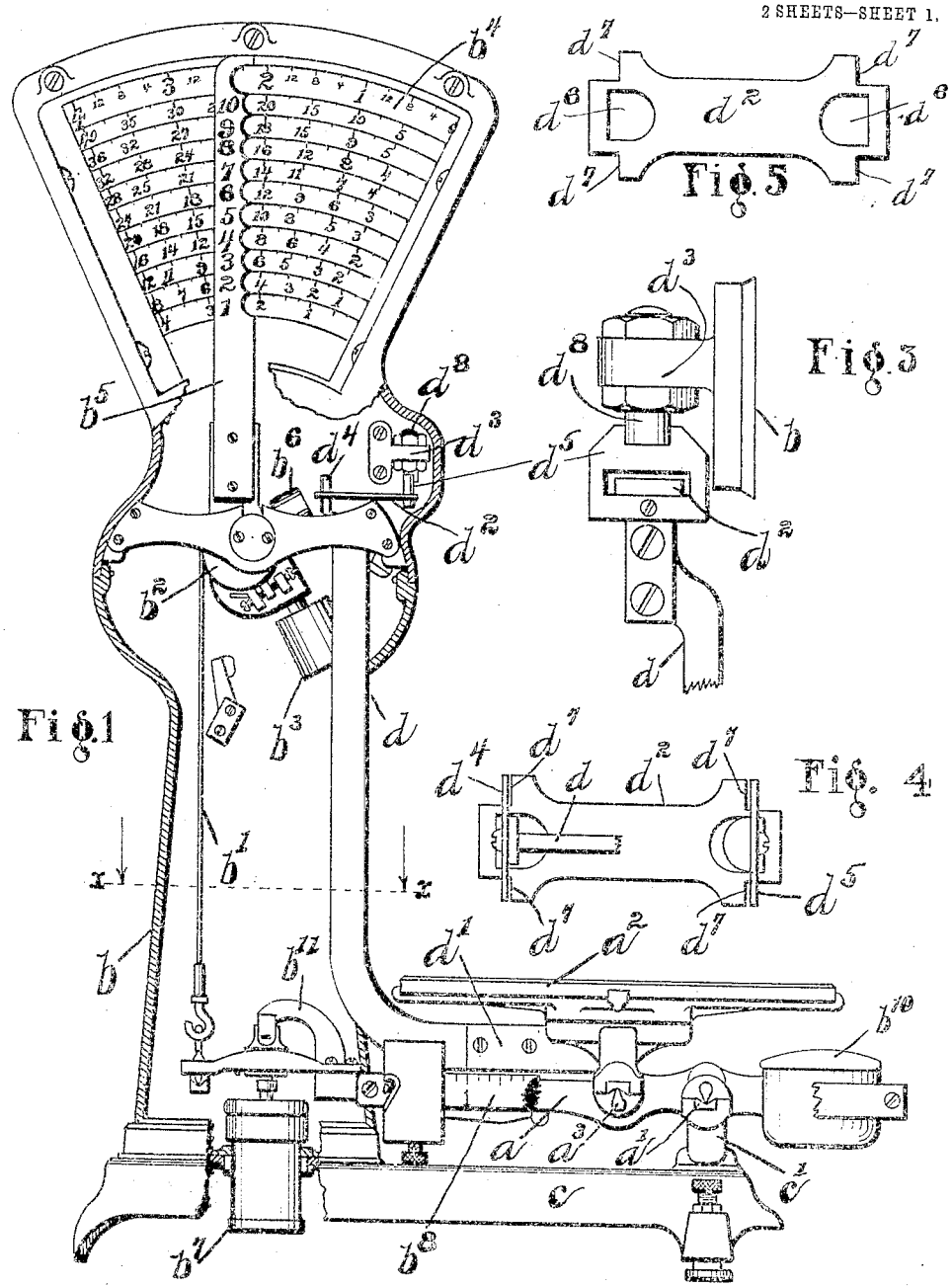

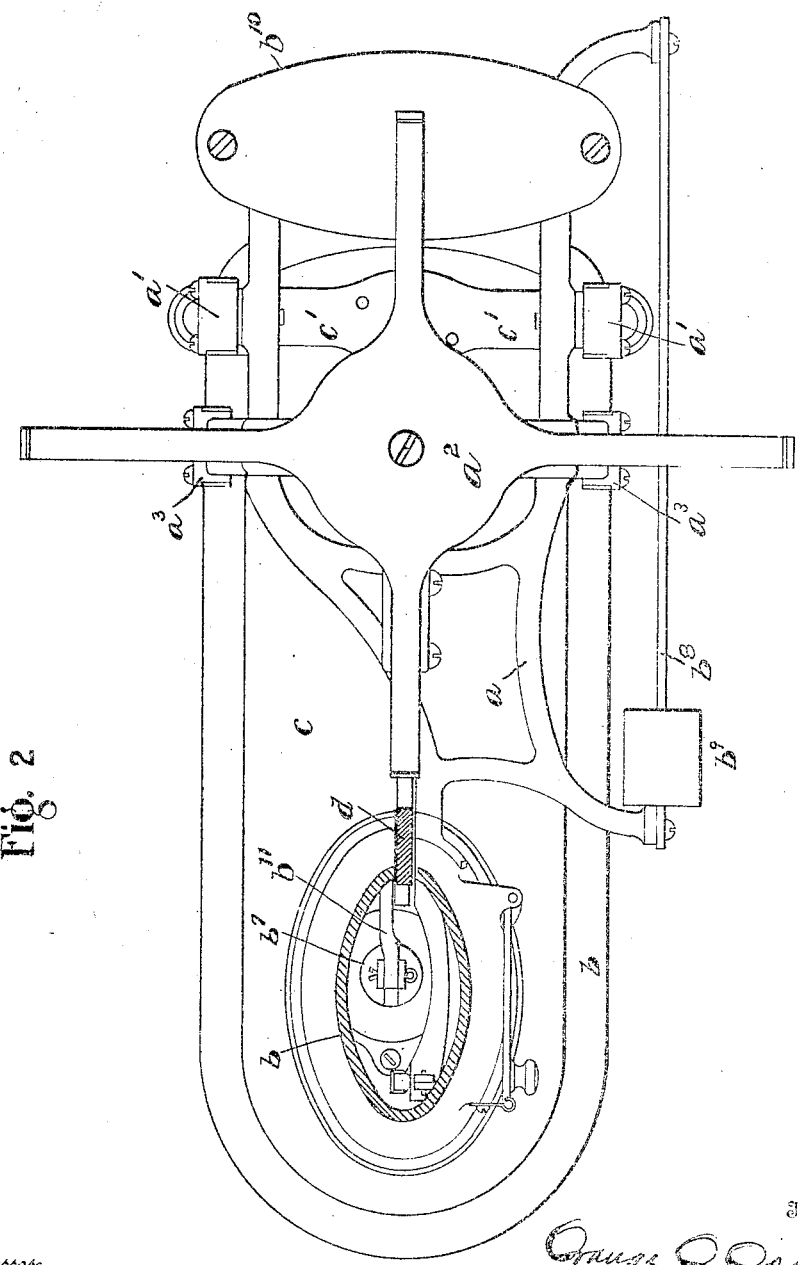

UNITED STATES PATENT OFFICE.

ORANGE O. OZIAS, OF DAYTON, OHIO, ASSIGNOR TO THE COMPUTING SCALE COMPANY, OF DAYTON, OHIO, A CORPORATION OF OHIO.

SCALE.

No. 921,881.　　　　　Specification of Letters Patent.　　　　　Patented May 18, 1909.

Application filed March 6, 1908. Serial No. 419,543.

*To all whom it may concern:*

Be it known that I, ORANGE O. OZIAS, a citizen of the United States, residing at Dayton, in the county of Montgomery and State of Ohio, have invented certain new and useful Improvements in Scales, of which the following is a specification.

My invention relates to improvements in computing scales, and it particularly relates to that class of computing scales in which all of the operating parts are supported upon a single base, with the scale pan or platform mounted upon a single knife-edged bearing upon each side thereof.

The object of my invention is to provide a computing scale of the above type in which the weighing pan or platform is materially reduced in height, getting a low construction which is desirable in this type of scale. At the same time the arrangement of the operating parts which assures a perfection of operation is such that they are of ready access both in assembling or for examination or repairs and which are furthermore more perfect and sensitive in their operation.

My invention consists in the construction and combination of parts hereinafter described and set forth in the claims.

In the said drawings Figure 1 is a side elevation of a device embodying my invention, the inclosing casing being shown in section and part of the base being broken away. Fig. 2 is a sectional view on the line $x\ x$ of Fig. 1. Fig. 3 is a detail of the link connection for the upper end of the check-rod, looking toward the left in Fig. 1. Fig. 4 is a bottom plan of the same. Fig. 5 is a detail of the link.

Like parts are represented by similar characters of reference in the several views.

In the said drawings, $a$ represents the main beam of the scale, fulcrumed at $a^1$ on knife-edged bearings, secured in the usual way to the upwardly and oppositely extending arms, $c^1$, on the base $c$, and carrying the usual platform $a^2$, which also rests upon the usual knife-edged bearings $a^3$, on opposite sides of the scale-beam. The main beam is extended into the housing $b$ and is connected in the usual way with a tape $b^1$, which tape is attached to the disk $b^2$, which is supported by knife-edged bearings in the housing structure $b$. Connected to the disk $b^2$ and hanging normally vertical is a pendulum $b^3$. Also connected to the disk and projecting at an angle to the pendulum is the usual pointer $b^5$ adapted to move over the chart or table $b^4$. The tape and pointer are counter-balanced by the adjustable counter-balance weight $b^6$. Also attached to said beam is the usual tare beam $b^8$ having the tare-poise, $b^9$. The beams and connected parts and the platform or pan are counter-balanced by the weight $b^{10}$.

$b^7$ is the usual dash-pot, the piston rod of which is attached to the extended arm $b^{11}$ of the main beam.

$d$ represents the check-rod which is attached at a suitable point to the platform or pan, as at $d^1$, and is projected rearwardly into the housing and thence upwardly, with its upper end pivotally connected by the link $d^2$ to the bracket $d^3$, which bracket is secured to the side of the housing, said link being loosely positioned in stirrups or loops, $d^4$ and $d^5$, on the check-rod and bracket respectively, in the usual manner. The link (Fig. 5) is provided with an opening $d^6$ and shoulders $d^7$ at each end thereof. The projecting stud or pin $d^8$ of the bracket $d^3$ is projected through the opening at one end of the link, and the stirrup or plate $d^5$ slipped over the end of the link and secured to the stud, which is flattened on its end. The upper end of the check-rod is likewise flattened and extended through the opening in the other end of the link, and has secured thereto the stirrup or plate $d^4$, which will be slipped over that end of the link. The respective shoulders of the link lie adjacent the respective plates $d^4\ d^5$.

Having thus described my invention, I claim:—

1. In a scale, a base, a beam fulcrumed near its outer end on said base, a housing, indicating devices located in said housing operated by the movement of said beam, a pan receiver or platform pivotally supported on said beam between the pivotal connection of said beam and the point of attachment between said beam and said indicating devices, an L-shaped rod, the vertical portion of which is located substantially within said housing and the horizontal portion thereof projecting outwardly from said housing and connected to said pan receiver or platform, and a link connection between said L-shaped check rod and said housing at the upper extremity thereof and within said housing, as and for the purpose specified.

2. In a computing scale, a base, a beam pivoted on said base, a housing, a price indicating chart located in said housing, said chart having graduations and numbers indicating the value of different quantities of commodities at different prices, an indicating hand coöperating with said chart and having a series of numbers indicating the prices, a connection between said hand and the end of said beam, said connection being formed within said housing into which the end of said beam is extended, a pan-receiver or platform pivoted on said beam near the main pivotal point of said beam, and on the outside of said housing, an L-shaped rod connected to said pan-receiver or platform beneath the same and extending into said housing, thence upwardly within said housing, and a link connection between the end of said L-shaped rod and housing, as and for the purpose specified.

3. In a computing scale, a base, a main beam pivoted near one end thereof to supports on said base, a platform on said beam, a counter-balance for said beam and platform on the opposite side of its pivotal connection from said platform, a housing extending upwardly from said base into which the other end of said beam extends, an indicating chart located in said housing, and an index hand having a depending pendulum also located in said housing, a connection within said housing between said pendulum and the projecting end of said beam, an L-shaped check-rod extending vertically within said housing and horizontally from said housing to said platform or pan-receiver to which it is pivoted, and a link connection also within said housing between the upper end of the check-rod and said housing, substantially as specified.

4. The combination with the base, and a main beam pivoted on said base near its extremities, a housing at the opposite end of said base from said pivotal connection and into which the end of said beam is adapted to project, a pan-receiver or platform pivoted on said beam between the pivotal connection of said beam and the said housing, a price indicating hand having a pendulum and disk connected thereto, and a value chart coöperating with said hand in said housing, said disk and pendulum being pivoted within said housing, a flexible connection between said disk and said beam, an L-shaped check rod extending horizontally from a point between the platform and the main beam, thence parallel with said beam to within the housing, the vertical portion of said check-rod extending upwardly substantially within said housing and pivoted at its upper end to said housing, substantially as and for the purpose specified.

5. In a computing scale, the combination with a base, a housing extending upwardly therefrom, a price computing table located in the upper part of said housing, an index hand in said housing having price-per-pound indications thereon pivoted at one end and coöperating at its opposite end with said table, a vertically depending weighted pendulum connected to said index hand, a single scale beam fulcrumed near its outer end upon said base, a dash-pot connected with said beam, the inner end of said scale beam projecting into said housing and having a flexible connection with said index hand, a pan-receiver or platform pivoted on said beam, and a check-rod connected to said pan-receiver or platform and projecting into said housing through a slotted opening thereon, said check rod being pivotally connected with said housing by means of a pivoted link, substantially as specified.

In testimony whereof, I have hereunto set my hand this 27th day of Feby. 1908.

ORANGE O. OZIAS.

Witnesses:
D. O. De Vanney,
I. A. Braum.